(12) United States Patent
Wagner (10) Patent No.: US 10,312,698 B2
(45) Date of Patent: Jun. 4, 2019

(54) CHARGER DEVICE FOR BATTERY SUPPORTED POWER SUPPLIES

(71) Applicant: KONINKLIJKE PHILIPS N.V., Eindhoven (NL)

(72) Inventor: Bernhard Wagner, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/897,327

(22) Filed: Feb. 15, 2018

(65) Prior Publication Data
US 2018/0191174 A1 Jul. 5, 2018

Related U.S. Application Data

(62) Division of application No. 15/520,143, filed as application No. PCT/EP2016/053212 on Feb. 16, 2016.

(30) Foreign Application Priority Data

Feb. 23, 2015 (EP) ...................................... 15156062

(51) Int. Cl.
*H02J 7/00* (2006.01)
*H02J 7/14* (2006.01)

(52) U.S. Cl.
CPC ............ *H02J 7/0018* (2013.01); *H02J 7/007* (2013.01); *H02J 7/0021* (2013.01); *H02J 7/0047* (2013.01); *H02J 7/0013* (2013.01); *H02J 7/0024* (2013.01)

(58) Field of Classification Search
USPC ........ 320/116, 118, 119, 117, 122, 125, 126, 320/127, 128
See application file for complete search history.

(56) References Cited

U.S. PATENT DOCUMENTS

| 5,666,041 | A | 9/1997 | Stuart |
| 6,271,645 | B1* | 8/2001 | Schneider ............. H02J 7/0014 320/118 |
| 6,841,971 | B1 | 1/2005 | Spee |
| 7,068,011 | B2 | 6/2006 | Yang |
| 7,508,166 | B2 | 3/2009 | Ishikawa |

(Continued)

FOREIGN PATENT DOCUMENTS

| JP | 2004194410 A | 7/2004 |
| WO | 2009145709 A1 | 12/2009 |

*Primary Examiner* — Alexis B Pacheco
(74) *Attorney, Agent, or Firm* — Larry Liberchuk (57) ABSTRACT

A charger device comprises a sensor which is configured to measure a differential current as a difference between a first current through a first battery portion of a battery and a second current through a second battery portion of the battery. The sensor is configured to provide a current difference signal based on the measured differential current. The charger device further comprises a compensator configured to calculate a first current setpoint used for the first battery portion and a second current setpoint used for the second battery portion based on the current difference signal and a battery current setpoint. The charger device also comprises a controller configured to control charging and/or discharging of the first battery portion based on the first current setpoint and of the second battery portion based on the second current setpoint.

5 Claims, 6 Drawing Sheets

(56) References Cited

U.S. PATENT DOCUMENTS

| | | | |
|---|---|---|---|
| 7,598,706 B2 | 10/2009 | Koski | |
| 7,777,451 B2 | 8/2010 | Chang | |
| 8,829,717 B2 * | 9/2014 | Kudo | H02J 7/0018 307/77 |
| 9,184,605 B2 * | 11/2015 | Chang | B60L 11/1866 |
| 2011/0234151 A1 * | 9/2011 | Uan-Zo-li | G06F 1/263 320/107 |
| 2012/0249071 A1 | 10/2012 | Yang | |
| 2013/0002030 A1 * | 1/2013 | Kumagai | H02J 7/0014 307/77 |
| 2016/0020621 A1 * | 1/2016 | Baby | H02J 7/0016 320/107 |
| 2016/0336804 A1 * | 11/2016 | Son | H02J 7/0027 |

* cited by examiner

CHARGER DEVICE FOR BATTERY SUPPORTED POWER SUPPLIES

The present invention relates to the field of charge compensators for battery supported power supplies, in particular in medical equipment, connected to protective earth potential. In particular, the present invention relates to a charger device, a power supply system and a method for controlling charging and discharging of a battery according to the independent claims.

Consumers which need a high level of D.C. supply voltage can be connected to a supplying battery. For high levels of output voltage, batteries consist of many cells which are connected in series. It may be necessary to connect one potential of the battery to the protective earth potential, e.g. for safety reasons. Separating the battery into two serial portions and connecting the such created central point to protective earth may be useful to reduce the insulation effort or voltage stress which occurs between any of the battery poles and any parts which are connected to protective earth potential.

In order to bring batteries to a desired state of charge, commercially available battery charging devices, also called chargers, may be used. Connecting one charger to a battery which consists of two serial portions which are centrally earthed, may lead to undesired high voltage in case of a single insulation fault, e.g. an insulation breakdown between one of the battery poles and a part which is connected to protective earth potential. This can be avoided, if a separate charger is used for any of the battery portions.

Non-symmetry charging of portions of batteries may lead to different states of charge of each of the portions of the battery which is not desired, resulting in unbalanced aging and capacity loss. Prevention of such different states of charge requires very high accuracy of the charging current measurements and state of charge measurements, for instance by a sophisticated and complex charge control. Available charging devices operate and balance parts or portions of the battery by, for instance, a so-called current regulation mode or by a voltage regulation mode.

However, modern lithium ion batteries have a rather flat charging curve. This means that the battery voltage hardly depends on state of charge for a wide range of the state of charge. As a consequence, the voltage regulation mode does not work properly in the flat area of the charging curve, because the charge state cannot be detected by a simple voltage measurement. Consequently, current regulation mode is preferably applied in the flat area of the charging curve.

There may be a need to improve charger devices for batteries.

These needs are met by the subject-matter of the independent claims. Further exemplary embodiments are evident from the dependent claims and the following description.

An aspect of the present invention relates to a charger device comprising: a sensor which is configured to measure a differential current as a difference between a first current through a first battery portion of a battery and a second current through a second battery portion of the battery and which is configured to provide a current difference signal based on the measured differential current wherein the first battery portion and the second battery portion are centrally earthed; a compensator which is configured to calculate a first current setpoint used for the first battery portion and a second current setpoint used for the second battery portion based on the provided current difference signal and a battery current setpoint; and a controller which is configured to control charging and/or discharging of the first battery portion based on the first current setpoint and of the second battery portion based on the second current setpoint wherein the controller comprises a first portion charging device which is configured to control charging and/or discharging of the first battery portion based on the first current setpoint; and a second portion charging device which is configured to control charging and/or discharging of the second battery portion based on the second current setpoint. In other words, the idea of the present invention may be regarded as the introduction of function blocks for separately control portions of the battery using an overlaying control loop. A function block is used for measuring a current difference between two battery portions, for example a positive and a negative battery half. The functional measurement block produces an output signal which represents the current difference.

A further, second aspect of the present invention relates to a power supply system comprising: a battery comprising a first battery portion and a second battery portion; and a charger device according to the first aspect of the present invention or according to any implementation form of the first aspect of the present invention, wherein the charger device is configured to control charging and/or discharging of the battery.

According to a third aspect of the present invention, a method for controlling charging and discharging of a battery is provided, the method comprising the steps of:
a) measuring a differential current as a difference between a first current through a first battery portion of a battery and a second current through a second battery portion of the battery and providing a current difference signal based on the differential current and wherein the first battery portion and the second battery portion are centrally earthed;
b) calculating a first current setpoint used for the first battery portion and a second current setpoint used for the second battery portion based on the current difference signal and based on a battery current setpoint by a compensator; and
c) controlling charging and/or discharging of the first battery portion by a controller based on the first current setpoint controlling charging and/or discharging of the second battery portion by the controller based on the second current setpoint; wherein the controller comprises a first portion charging device which is configured to control charging and/or discharging of the first battery portion based on the first current setpoint; and a second portion charging device which is configured to control charging and/or discharging of the second battery portion based on the second current setpoint.

According to an exemplary embodiment of the present invention, the compensator comprises an amplifier configured to amplify the current difference signal for calculating the first current setpoint and the second current setpoint. This advantageously allows improving the accuracy of the current balancing of the battery portions.

According to an exemplary embodiment of the present invention, the compensator comprises an integrator configured to integrate the current difference signal for calculating the first current setpoint and the second current setpoint. This advantageously allows avoiding a fast unbalance of the single battery portions.

According to an exemplary embodiment of the present invention, the compensator is configured to be operated as a proportional-integral controller or as a proportional controller, a proportional-integral controller, a proportional-derivative controller or as a proportional-integral-derivative controller or as a dead-beat controller. This advantageously allows compensating for errors and advantageously provides rapid response times.

According to an exemplary embodiment of the present invention, the charger device is configured to control a state of charge of the battery within a predefined range of the state of charge of the battery.

According to an exemplary embodiment of the present invention, the sensor is configured to measure the differential current over a current range between 0 and 1 A, preferably between 0 and 100 mA, most preferably between 0 and 10 mA.

According to an exemplary embodiment of the present invention, the sensor is configured to measure the differential current of the first current and the second current in a range of single digit percentage of the first and/or the second current, preferably in a current range of single digit per thousands of the first and/or the second current.

According to an exemplary embodiment of the present invention, the compensator is configured to calculate the first current setpoint and the second current setpoint by means of a minimization control loop of the current difference signal.

According to the present invention, the first battery portion and the second battery portion are centrally earthed. This advantageously allows reducing the in the system maximally arising voltage levels, thus, minimizing the demands and efforts for voltage isolation.

The term "centrally earthed" in connection with portions as used by the present invention may refer to an arrangement of the battery portions and the earthing connection, wherein the earthing to ground potential is coupled at a position between the two battery portions. Differential currents within the battery portions will be conducted to protective earth potential which is undesired for some applicable medical devices.

The methods, systems and devices described herein may be implemented as software in a Digital Signal Processor, DSP, in a micro-controller or in any other side-processor or as hardware circuit within an application specific integrated circuit, ASIC or in a field-programmable gate array which is an integrated circuit designed to be configured by a customer or a designer after manufacturing.

The present invention can be implemented in digital electronic circuitry, or in computer hardware, firmware, software, or in combinations thereof, e.g. in available hardware of conventional medical devices or medical imaging device or in new hardware dedicated for processing the methods described herein.

The present invention particularly allows for application in medical imaging systems, either mobile (e.g. mobile diagnostic radiology) or fixed (e.g. computed tomography systems, magnetic resonance systems or interventional radiology systems). Such systems requirement uninterrupted power supply, also in the event of a breakdown of the hospital mains supply. For that purpose, the power supply of such systems is typically supported, more specifically buffered, by battery packs. Such battery backs may be advantageously charged using the present invention.

These and other aspects of the present invention will become apparent from and be elucidated with reference to the embodiments described hereinafter. A more complete appreciation of the present invention and the attendant advantages thereof will be more clearly understood with reference to the following schematic drawings.

A more complete appreciation of the present invention and the attendant advantages thereof will be more clearly understood with reference to the following schematic drawings, which are not to scale, wherein.

The illustration in the drawings is purely schematical and does not intend to provide scaling relations or size information. In different drawings or figures, similar or identical elements are provided with the same reference numerals. Generally, identical parts, units, entities or steps are provided with the same reference symbols in the description.

Figure 1:
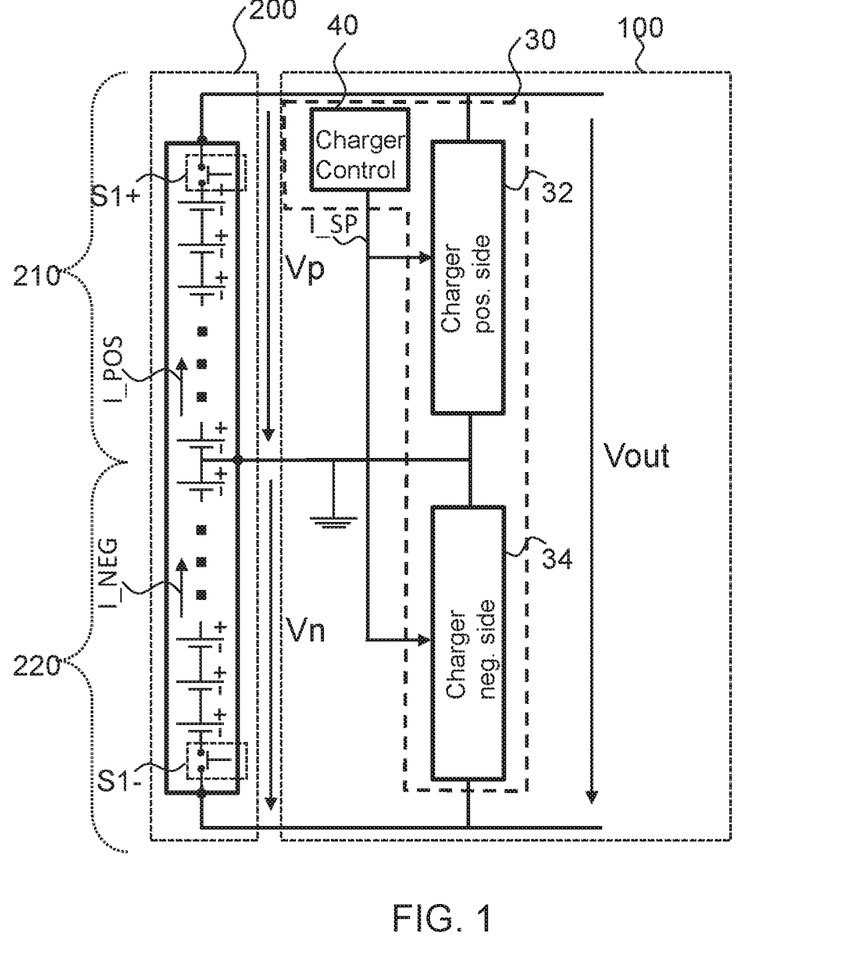
FIG. 1 shows a schematic diagram of a charger device according to an exemplary embodiment of the present invention.

FIG. 1 shows a charger device 100 according to an exemplary embodiment of the present invention. The charger device 100 may be coupled to a battery 200. The battery 200 may comprise a first battery portion 210 and a second battery portion 220. For instance, the first battery portion 210 and the second battery portion 220 are halves or any other equivalent share—thirds or quarters—or non-equivalent shares of the battery 200.

The battery portions 210, 220 may be centrically earthed, for instance if the battery portions 210, 220 are equivalent shares of the battery 200.

The battery portions 210, 220, also denoted pos. side and neg. side in FIG. 1, i.e. positive side and negative side of the battery 200, may be separately electrically switchable using the contactors S1+ and S1−. A first current I_POS may flow through the first battery portion 210 of the battery 200 and a second current I_NEG through the second battery portion 220 of the battery 200.

If the battery portions 210, 220 are for instance connected in series, the battery 200 provides the output voltage Vout. The voltages Vp and Vn are the voltages across the two battery portions 210, 220, respectively. In other words, the output voltage Vout is the sum of Vp and Vn.

The output voltage Vout of the battery 200 may be in the range between 0 and 2500 V, preferably between 60 and 1500 V, most preferably between 100 V and 1000 V.

The charger device 100 may be used for power supplies for larger medical devices, which comprise a battery pack in form of the battery 200 as an energy buffer. The charger device 100 may comprise a sensor 10, a compensator 20—both not shown in FIG. 1—, and a controller 30. The battery current setpoint I_SP may be provided by a charger control 40, a battery management system used for the battery 200. The charger control 40 may be part of the controller 30—as shown in FIG. 1—or of the charger device 100.

Other high performance systems like iXR-systems for CN application may use battery buffered supplies to support their UPS function. Currently, a trend to increasing numbers of battery buffered applications is visible in many medical applications.

Another trend shows increasing performance of UPS functions: Not only data processing and image processing is supported, but also primary function of image generation may be supported for a specified time period during a lack of mains supply.

According to an exemplary embodiment of the present invention as shown in FIG. 1, it may be useful to connect the battery 200 as well as the charger device 100 centrally to P.E. potential, i.e. protective earth or earth ground potential in an electrical circuit. In other words, the battery portions 210, 220 are centrally earthed as shown in FIG. 1.

This creates the possibility that the charging currents of the two separate chargers in form of the first portion charging device 32 and a second portion charging device 34 are not equal, leading to non-symmetrical charging. This effect may occur if the actual currents provided by the first portion charging device 32 and the second portion charging device 34 differ from each other. Non symmetric charging may lead to different states of charge of the two battery portions 210, 220 which is not desired. Furthermore it necessarily leads to a dc-component of the earth leakage current because the central point between the two battery halves is connected to protection earth potential (FIG. 1). Earth leakage current is restricted by applicable standards of medical devices which are in the scope of this invention. The charger device 100 may be configured to actively compensate this difference of charge and thus canceling out the dc-component of the earth leakage current.

Figure 2:
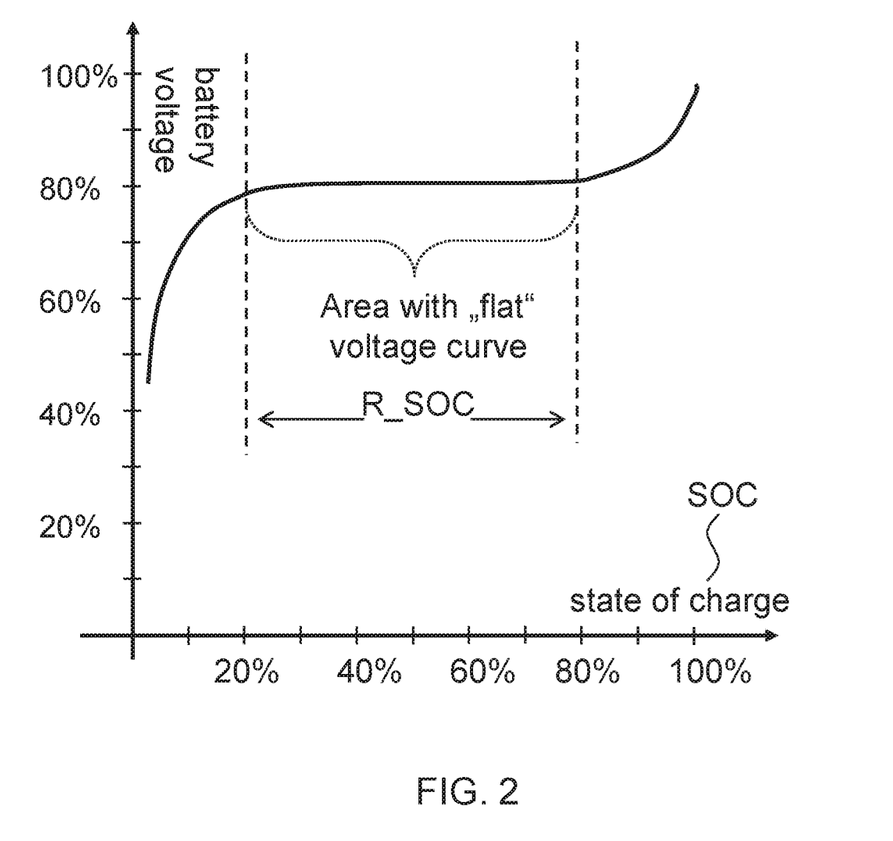
FIG. 2 shows a schematic diagram of a charging curve of a battery for explaining the present invention.

FIG. 2 shows a schematic diagram of a charging curve of a Li-Ion battery for explaining the present invention.

Actually, it is not trivial to keep both battery halves on the same state of charge. Charging devices operate either in current regulation mode or in voltage regulation mode. However, modern Lithium-Ion batteries as used as battery 200 have a rather "flat" charging curve. This means that the battery voltage Vout—as well as the voltages Vp and Vn of any portion of the battery—depends on its charge state in a wide range, as shown in FIG. 2.

As a consequence, the voltage regulation mode does not work in the "flat" area, because the charge state cannot be detected by a simple voltage measurement. So, in this area, the battery is preferably charged with a constant current.

Therefore, current regulation is the preferred operation mode, combined with a charge controller which integrates the charging and discharging current of each battery side, by which the state of charge is normally kept within the desired window.

However, any closed loop control is based on the measurement of an actual value. The total accuracy of commercially available current measurement or charge quantisation devices is limited. High quality devices can measure to tolerances of ±1% of the rated current.

Thus, in the worst case, if one charger delivers 0.99 times the nominal current value and the other charger delivers 1.01 times the nominal current value, the total current difference could add up to 2% of the nominal current.

Note that the "flat" area is preferred for operation due to the fact that there the ageing of the battery 200 is minimal. At the states of full charge and at very low charge, the life time reduction of the battery is disproportionately high. The charger device 100 may be configured to control a state of charge SOC of the battery 200 within a predefined range R_SOC of the state of charge SOC of the battery 200.

Due to limited accuracy, and uneven self-discharge of the battery, the charge integrator has to be re-calibrated occasionally, which is preferably done by charging the battery until a voltage rise is observed of which the precise state of charge can be concluded. Due to different rates of self-discharge of the individual battery cells, this does not happen simultaneously at each cell, but typically one cell starts building up voltage first.

In order to get all cells back to a synchronized state of charge, the already fully charged cells must not be charged further, which is achieved by bypassing the cell, e.g. with a dump resistor, that allows the external charging to continue and charge only cells, which are not yet fully charged. This process is called balancing or cell balancing. Usually, the self-discharge of cells is very low, e.g. in the order of $\mu A$, so that also small bypass current is required to achieve the balances state in reasonable time, and the balancing process is seldom required.

In difference to that, the deviating currents which result from differences in the two charger modules can be much higher, e.g. in the order of percent, i.e. 100 mA for a 5 kW charger of 500 V, leading much faster to an inacceptable unbalance, and requires much longer time to compensate and more frequent balancing. In order to avoid non-symmetries of the charger modules, a very high precision in regard to the output current is needed, much better than normal 1% which leads to much higher costs.

Remaining for a long charging time period in the desired "flat" area, the current deviation of the chargers may lead to different states of charge of the two battery portions. One portion may be charged to 25%, the other to 80% of maximum charge. This difference of charge is not noticeable by voltage measurement.

The effect of different charging states of the two battery portions is undesired, because operation with heavy load may reduce the charge state lower than for instance 25%. In this case the voltage drop of the weakly charged battery portion may limit the performance of the power consumer.

Figure 3:
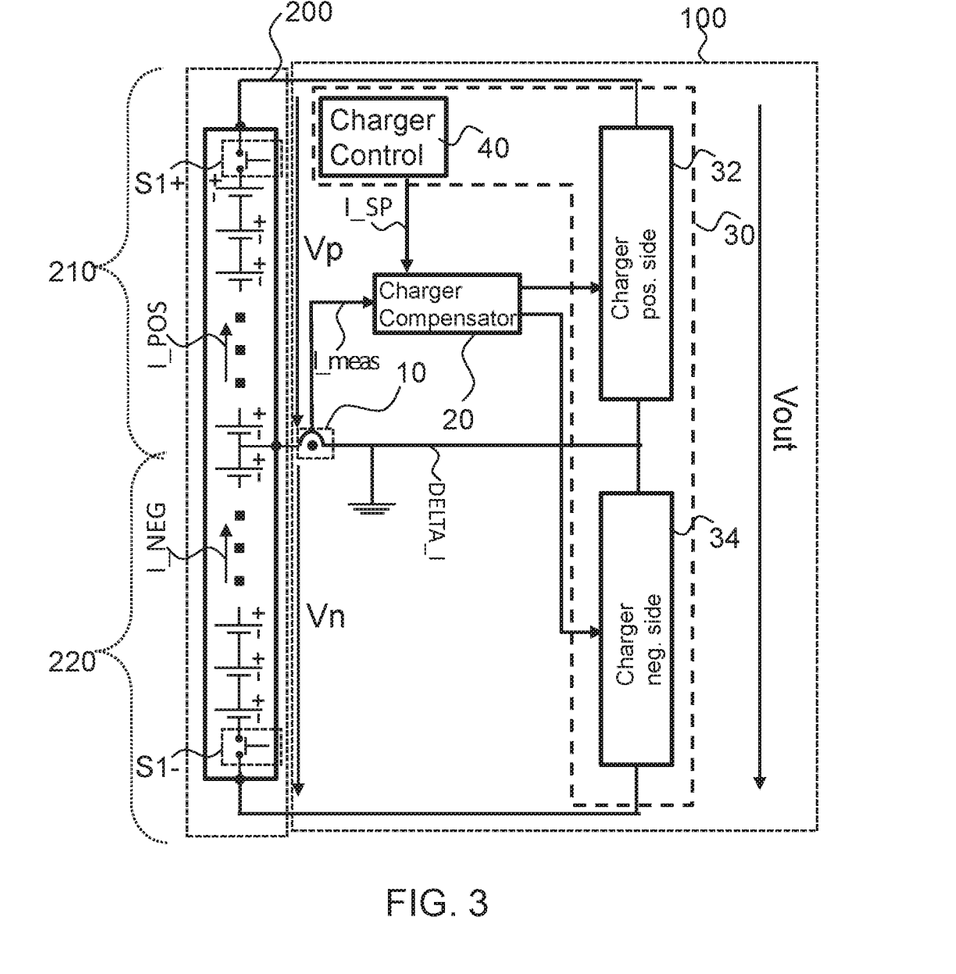
FIG. 3 shows a charger device according to an exemplary embodiment of the present invention.

FIG. 3 shows a charger device 100 comprising a sensor 10, a compensator 20, and a controller 30.

The sensor 10 may be configured to measure a current difference DELTA_I based on the first current I_POS and the second current I_NEG.

The compensator 20 may be configured to calculate a first current setpoint I_SP_POS used for the first battery portion 210 and a second current setpoint I_SP_NEG used for the second battery portion 220 based on the current difference signal ΔI_meas and a battery current setpoint I_SP.

The battery current setpoint I_SP may be provided by a charger control 40, a battery management system, which may provide charging and discharging controlling for the battery 200 as a whole, not for single battery portions 210, 220. In other words, the battery current setpoint I_SP may be a general setpoint for the total charging or discharging current of the battery 200.

The controller 30 may comprise a first portion charging device 32 and a second portion charging device 34.

The first portion charging device 32 may be configured to control charging and/or discharging of the first battery portion 210.

The second portion charging device 34 may be configured to control charging and/or discharging of the second battery portion 220.

Figure 4:
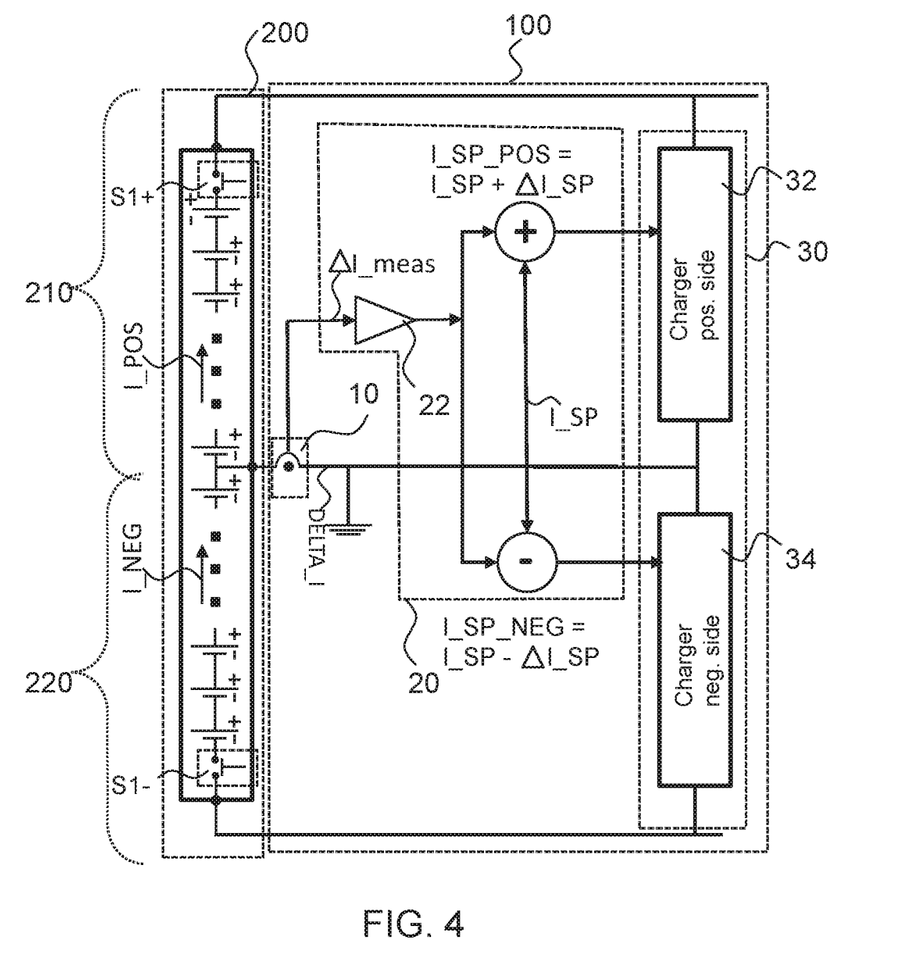
FIG. 4 shows a charger device according to an exemplary embodiment of the present invention.

According to an exemplary embodiment of the present invention as shown in FIG. 4, the compensator 20 may comprise an amplifier 22. The amplifier 22 may be configured to amplify the current difference signal ΔI_meas for calculating the first current setpoint I_SP_POS and the second current setpoint I_SP_NEG.

Figure 5:
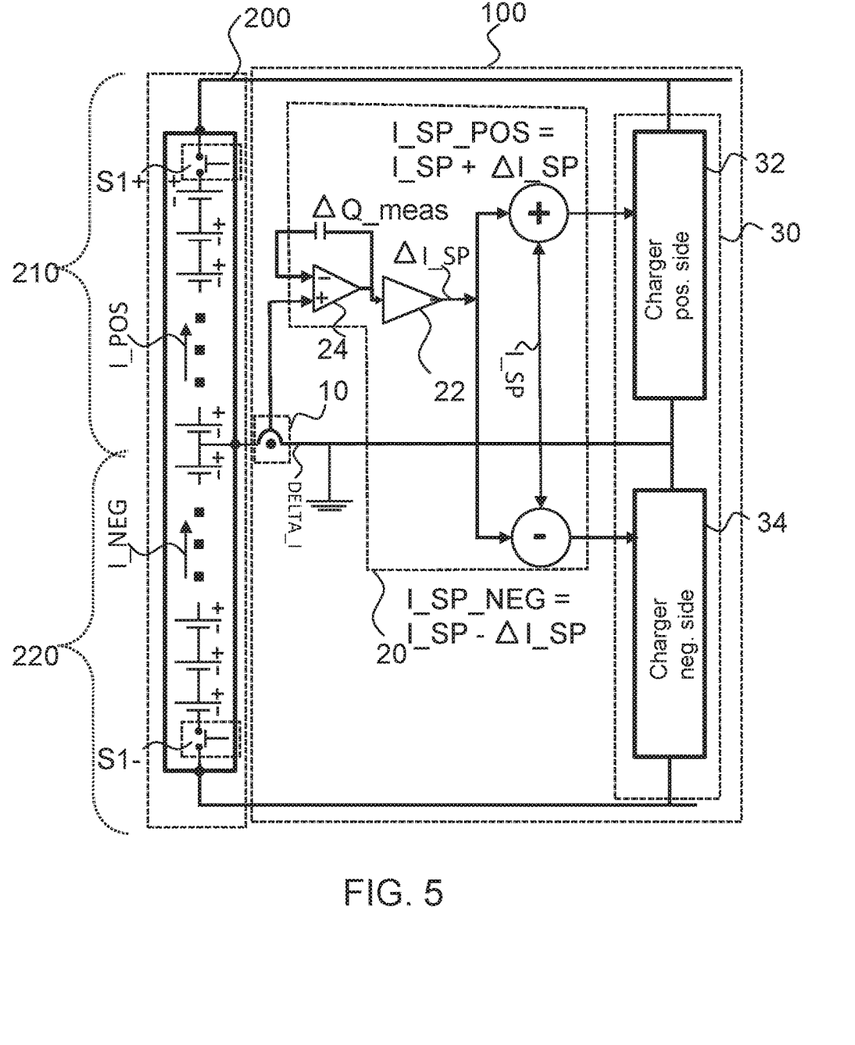
FIG. 5 shows a schematic diagram of a charger device according to an exemplary embodiment of the present invention.

According to an exemplary embodiment of the present invention as shown in FIG. 5, the compensator 20 may further or alternatively comprise an integrator 24. The integrator 24 may be configured to integrate the current difference signal ΔI_meas for calculating the first current setpoint I_SP_POS and the second current setpoint I_SP_NEG.

The compensator 20 may be configured to be operated as a proportional-integral controller or as a proportional-integral-derivative controller.

The sensor 10, the compensator 20, and the controller 30 may be configured to be operated as function blocks which close an overlaying control loop.

The sensor 10 may be configured as a measurement block for measuring the differential current DELTA_I of the first battery portion 210 and the second battery portion 220, the positive and the negative battery half. In other words: The sensor 10 may be configured for measuring a current difference DELTA_I based on the first current I_POS and the second current I_NEG. The measurement block in form of the sensor 10 produces an output signal called ΔI_meas which represents the current difference DELTA_I.

Normally the design of the charger device 10 leads to a zero-difference current, because the regular charge and discharge currents are designed to be symmetric. So at the shown point, only the error signal is visible, so that a current sensor can be designed for a low current measurement range, which will provide the required resolution within the single digit percentage range (or even lower) of the charging currents with little effort. The demanding requirement for the current sensor 10 is a low D.C. offset of the output signal ΔI_meas.

The measured delta current ΔI_meas signal is fed to a second additional function block, the compensator 20, a charge compensator. The compensator 20 may use the charger current setpoint I_SP as a further input signal. The compensator 20 may generate two distinct setpoints for the two chargers, for instance I_SP_POS and I_SP_NEG as output signals. The charge compensator 20 may generate these setpoints such that the resulting charge difference is ideally zero, i.e. below 0.1% of the first current I_POS or the second current I_NEG.

The basic idea of the present invention is to eliminate the charge difference by affecting the current setpoints of the two chargers—the first portion charging device 32 and the second portion charging device 34—and to measure the error signal at point in the system where the typical high signal magnitudes are compensated and only the error signal prevails.

Tolerances of the original internal current measurement devices can be compensated by feeding slightly deviating setpoints to them. So the resulting actual charging currents ideally do no longer deviate from each other and the current difference results to zero. This is possible because the measurement of the current difference ΔI can easily be done with a much higher resolution than with the charger internal current measurement devices which need to be dimensioned for the entire charging current.

The further reference signs as present in FIG. 3 were already described in FIG. 1 and are therefore not further explained.

FIG. 4 shows a charger device according to an exemplary embodiment of the present invention.

The measured current signal ΔI_meas is fed to an amplifier 22 which generates a differential current setpoint for the charger. This setpoint is added to the setpoint of one of the chargers and subtracted to the setpoint of the complementary charger. The signal addition is done such that the loop ideally results in an extremely small current difference ΔI. The remaining value of ΔI depends on both offsets of the current measuring device and of the amplifier as well as of the gain of the amplifier 22.

The further reference signs as present in FIG. 4 were already described in FIGS. 1 and 3. Therefore, these already depicted reference signs are not further explained.

FIG. 5 shows a charger device according to an exemplary embodiment of the present invention.

According to an exemplary embodiment of the present invention, the current difference is integrated to generate the setpoint deviation ΔI_SP: The sensor 10 may be used as a current measurement device which measures the delta current at the battery 200, and an integrator 24 may be employed:

The use of an integrator 24—an integrative part of a controller—may enable to detect not only the current difference but its integral which is the charge difference. Next in line is as in other embodiments of the present invention, a correcting element in form of the controller 30 is used which correspondingly may control the current setpoints of the two chargers.

According to an exemplary embodiment of the present invention, the integrator 24 may output a value or signal which corresponds to the charge difference ΔQ=Integral of (ΔI)dt. With an ideal integrator the charge difference can be completely compensated, as long as the D.C. offsets of both the current sensor 10 and the subsequent integrator and amplifier devices are negligible.

According to an exemplary embodiment of the present invention, the amplifier 22 and integrator 24 are functional building blocks. Various ways of their realization are possible: Pure P-amplifier 22, as shown in FIG. 4, ideal integrator amplifier or integrators 24 as shown in FIG. 5 and also real integrators, a so called PI-controller or PID-controller may be used.

The further reference signs as present in FIG. 5 were already described in FIGS. 1, 3 and 4. Therefore, these already depicted reference signs are not further explained.

Figure 6:
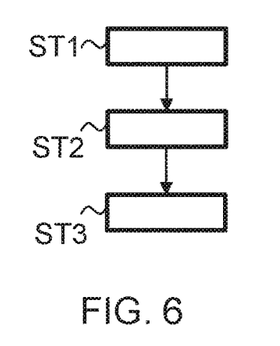
FIG. 6 shows a schematic flow-chart diagram of a method for controlling charging and discharging of a battery according to an exemplary embodiment of the present invention.

FIG. 6 shows a flow-chart diagram for a method for charging and discharging of a battery according to an exemplary embodiment of the present invention.

a As a first step of the method, measuring ST1 a differential current DELTA_I as a difference between a first current I_POS through a first battery portion 210 of a battery 200 and a second current I_NEG through a second battery portion 220 of the battery 200 and providing a current difference signal ΔI_meas based on the measured differential current DELTA_I may be conducted.

The current difference signal ΔI_meas can be derived by measurement of this differential current DELTA_I which is conducted back from the central connection point of the two battery portions to the connection point of the two portion charging devices 32, 34.

b As a second step of the method, calculating ST2 a first current setpoint I_SP_POS used for the first battery portion 210 and a second current setpoint I_SP_NEG used for the second battery portion 220 based on the provided current difference signal ΔI_meas and based on a battery current setpoint I_SP by a compensator 20 may be conducted.

c As a third step of the method, controlling ST3 charging and/or discharging of the first battery portion 210 may be conducted by a controller 30 based on the first current setpoint I_SP_POS, further, controlling charging and/or discharging of the second battery portion 220 may be conducted by the controller 30 based on the second current setpoint I_SP_NEG.

Alternatively, the charging and/or discharging of the first battery portion 210 and of the second battery portion 220 may be conducted by a first portion charging device 32 and by a second portion charging device 34, respectively.

Figure 7:
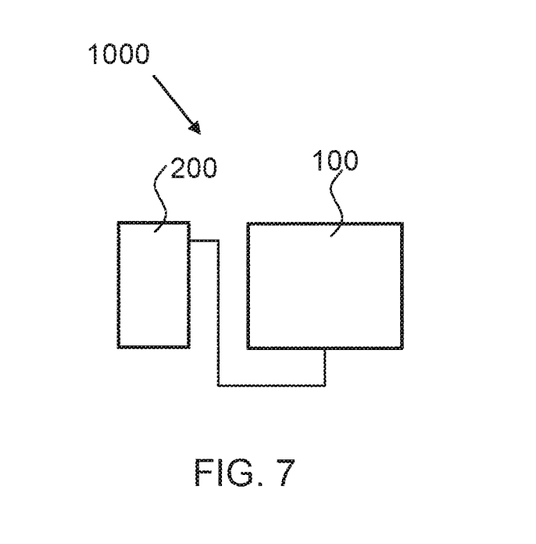
FIG. 7 shows a schematic diagram of a power supply system according to an exemplary embodiment of the present invention.

FIG. 7 shows a schematic diagram of a power supply system according to an exemplary embodiment of the present invention.

A power supply system 1000 may comprise a battery 200 comprising a first battery portion 210 and a second battery portion 220. The power supply system 1000 may further comprise a charger device 100, wherein the charger device 100 is configured to control charging and/or discharging of the battery 200.

The invention claimed is:

1. A power supply system, comprising:
    a battery comprising a first battery portion and a second battery portion; and
    a charger device comprising a sensor configured to measure a differential current as a difference between a first current through the first battery portion and a second current through the second battery portion and to provide a current difference signal based on the measured differential current, wherein the first battery portion and the second battery portion are centrally earthed; the charger device further comprising a compensator configured to calculate a first current setpoint used for the first battery portion and a second current setpoint used for the second battery portion based on the current difference signal and a battery current setpoint; the charger device further comprising a controller configured to control charging and/or discharging of the first battery portion based on the first current setpoint and of the second battery portion based on the second current setpoint, wherein the controller comprises a first portion charging device configured to control charging and/or discharging of the first battery portion based on the first current setpoint, and a second portion charging device configured to control charging and/or discharging of the second battery portion based on the second current setpoint;
    wherein the charger device is configured to control charging and/or discharging of the battery.

2. A method for controlling charging and discharging of a battery, comprising:
    measuring a differential current as a difference between a first current through a first battery portion of the battery and a second current through a second battery portion of the battery;
    providing a current difference signal based on the differential current, wherein the first battery portion and the second battery portion are centrally earthed;
    calculating a first current setpoint used for the first battery portion and a second current setpoint used for the second battery portion based on the current difference signal and a battery current setpoint;
    controlling charging and/or discharging of the first battery portion based on the first current setpoint; and
    controlling charging and/or discharging of the second battery portion based on the second current setpoint.

3. The method according to claim 2, wherein calculating the first current setpoint and/or the second current setpoint is performed by a calculation selected from a proportional calculation, a proportional-integral calculation, a proportional-derivative calculation, and a proportional-integral-derivative calculation.

4. The method according to claim 2, wherein calculating the first current setpoint and/or the second current setpoint is performed by integrating the current difference signal.

5. The method according to claim 2, wherein calculating the first current setpoint and/or the second current setpoint is performed by a minimization control loop of the current difference signal.

* * * * *